(No Model.) 3 Sheets—Sheet 1.
L. C. HUSON.
ROTARY ENGINE.
No. 398,512. Patented Feb. 26, 1889.
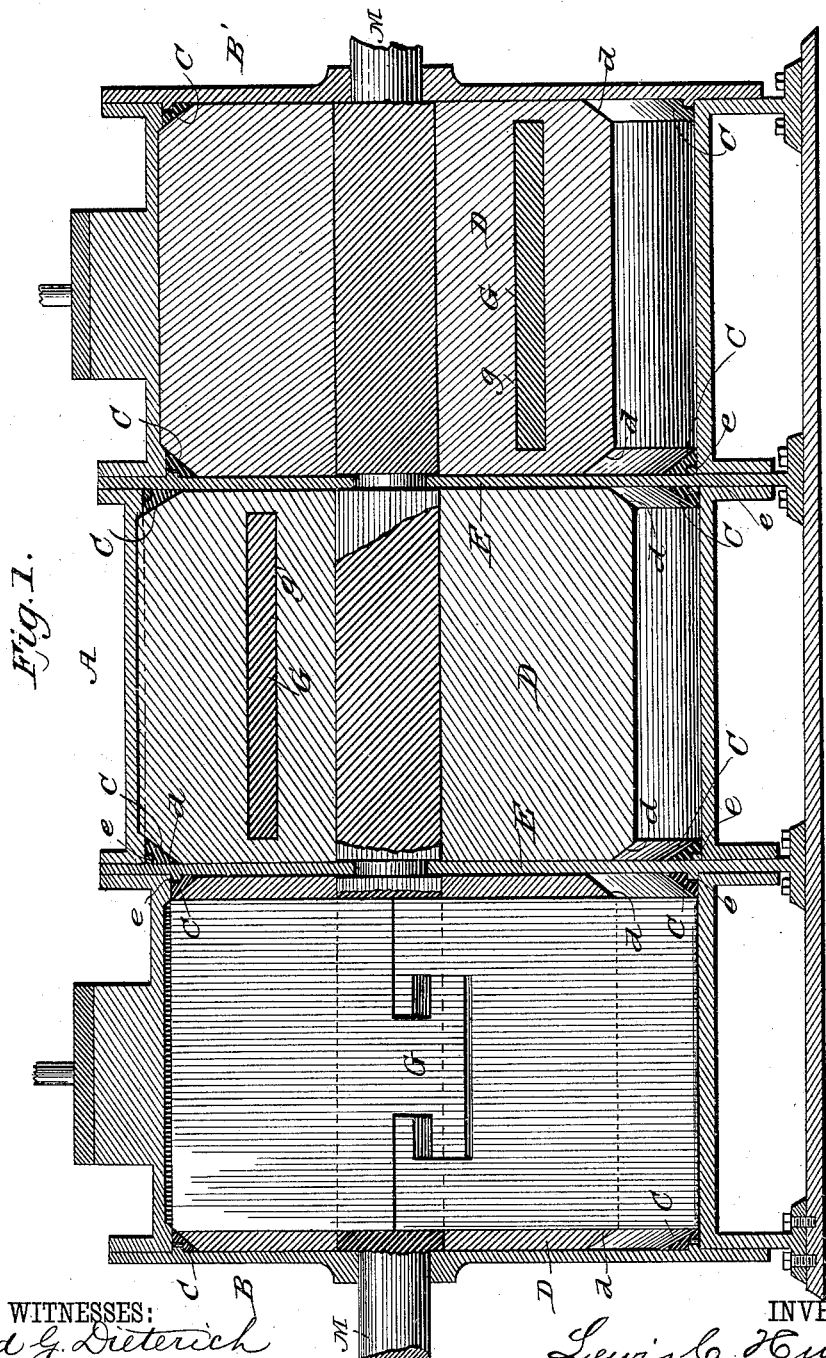
WITNESSES:
Fred G. Dieterich
P. B. Turpin
INVENTOR:
Lewis C. Huson
BY
ATTORNEYS.

(No Model.) 3 Sheets—Sheet 2.
L. C. HUSON.
ROTARY ENGINE.
No. 398,512. Patented Feb. 26, 1889.
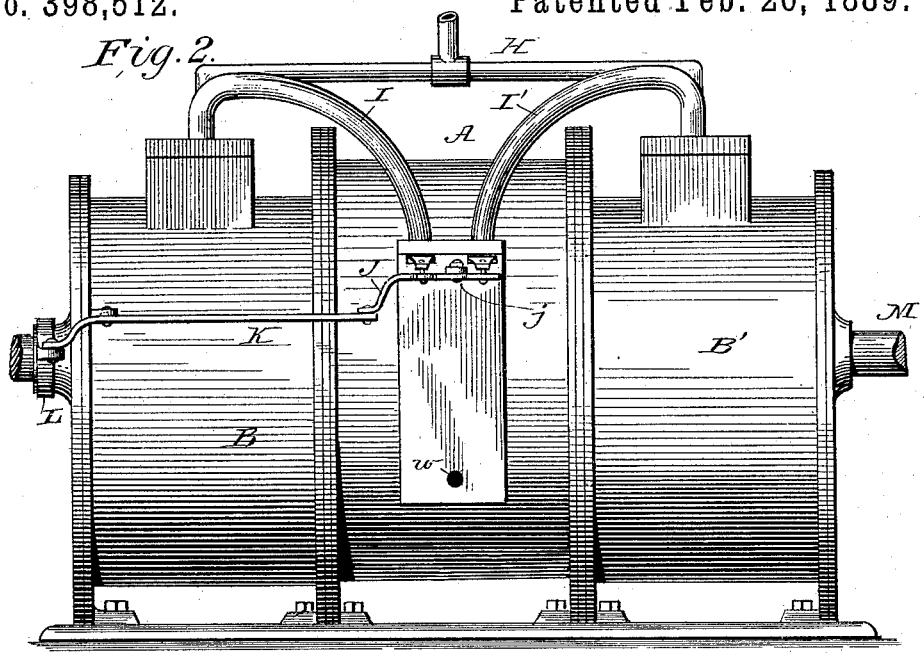
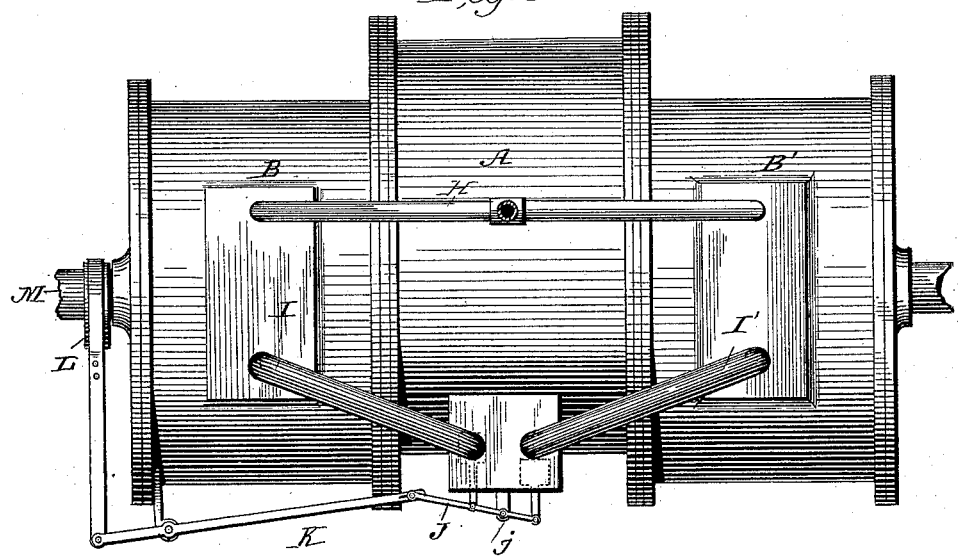
WITNESSES:
Fred G. Dieterich
P. B. Turpin
INVENTOR:
Lewis C. Huson
BY
ATTORNEYS.

(No Model.) 3 Sheets—Sheet 3.

L. C. HUSON.
ROTARY ENGINE.

No. 398,512. Patented Feb. 26, 1889.

WITNESSES:
Fred G. Dietrich
P. B. Turpin

INVENTOR:
Lewis C. Huson
BY
ATTORNEYS.

UNITED STATES PATENT OFFICE.

LEWIS C. HUSON, OF ELMIRA, ASSIGNOR TO ROMEYN B. AYRES, OF HAMMONDSPORT, NEW YORK, AND JOHN H. HOSIE, OF SCRANTON, PENNSYLVANIA, AND THE HUSON MOTOR COMPANY, (LIMITED.)

ROTARY ENGINE.

SPECIFICATION forming part of Letters Patent No. 398,512, dated February 26, 1889.

Application filed October 24, 1888. Serial No. 288,992. (No model.)

*To all whom it may concern:*

Be it known that I, LEWIS C. HUSON, of Elmira, in the county of Chemung and State of New York, have invented a new and useful Improvement in Rotary Engines, of which the following is a specification.

My invention is an improvement in rotary engines.

The invention has for an object to provide a compound engine comprising three separated chambers or sections, each having a piston head or drum, and all of such heads or drums being fixed on the same shaft, live steam being supplied to two of such chambers, and the exhaust-steam from both such chambers being discharged into the third chamber, so that two of the three heads or drums will be operated by live steam and the third by exhaust-steam, and by preference the exhaust-steam from said two chambers passes alternately into the third chamber.

The invention also has for an object to provide novel constructions in the head or drum whereby to increase the bearing-surface for the steam without diminishing the guide-surface of the blade or piston.

The invention has for further objects after improvements; and it consists in certain novel constructions and combinations of parts, as will be hereinafter described and claimed.

Figure 4:
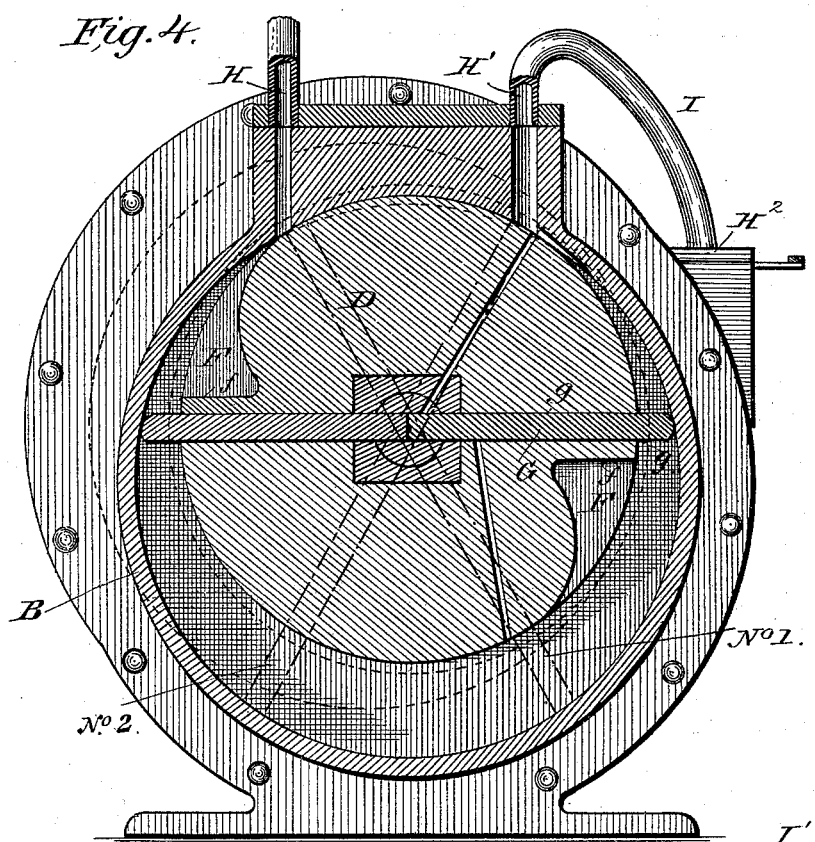
Figure 5:
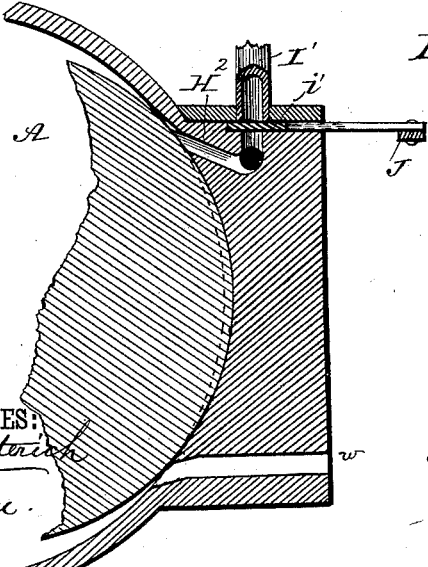
Figure 6:
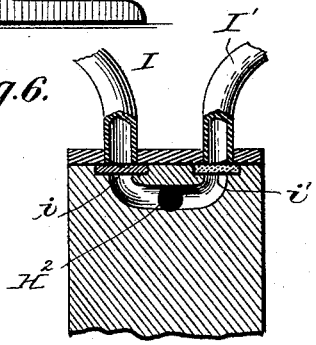

In the drawings, Figure 1 is a vertical longitudinal section; Fig. 2, a front elevation; Fig. 3, a top plan view. Fig. 4 is a transverse section of my engine, and Figs. 5 and 6 are detail sectional views.

In the construction shown the three chambers A B B' are arranged close together, the chambers B B' being arranged on opposite sides of the chamber A, and for such reason, and for convenience of reference, I shall refer to chamber A as the "central" chamber or section, and to chambers B B' as the "side" chambers or sections. These chambers are formed of the cylinders and the end plates, the joint between such parts being packed by the rings C, which rings are beveled on their inner faces to correspond with the beveled edges $d$ of the heads or pistons D, and are pressed inward against such edges by springs, as shown.

The end plates, E, of the central chamber form partitions between such chamber and the side chambers, and are provided with short annular flanges $e$, which fit within the central and side cylinders and facilitate the proper connection and packing of the chambers at the juncture of said parts. The several heads or pistons D are alike in construction, the central one being preferably larger than the side ones, as shown, and the relative arrangement of the blades or pistons in said chambers is shown in Fig. 4, in which the piston of side chamber, B, is shown in full lines, the piston of the central chamber, A, in dotted lines No. 1, and the piston of the other side chamber, B', in dotted lines No. 2, such piston being arranged on about thirds, as shown, so that the side chambers will exhaust alternately into the central chamber.

An important feature of my invention is the recesses F, formed in the piston-heads D immediately in rear of the guideways $g$ for the pistons G. These recesses enable the engine to take steam quicker and better, and have an end wall, $f$, which separates them from said ways $g$, such walls $f$ being formed to provide a bearing against which the steam may act to drive the piston-heads. By preference I form the walls $f$ on lines approximately parallel to the blades or pistons, such construction increasing the surface, against which the steam may act without in any degree decreasing the length and efficiency of the guideway of the blade or piston.

Each of the side chambers has steam-inlet ports H and exit or exhaust ports H', the inlet-ports being suitably connected with the source of steam-supply and the exhaust-ports being connected by pipes or channels I I' with the inlet-port H² of the central chamber or section.

As before described, the exhaust, by the relative arrangement of the blades or pistons in the side chambers, is discharged alternately from said chambers into the central chamber or section; but in order to control the discharge of such exhaust into said chamber it may be preferred to provide cut-off valves $i$ $i'$ operating in pipes or channels I I' and supported on lever J, on opposite sides of the pivot $j$ of said lever, such lever J being connected with one end of a lever, K, the opposite end of which lever K is connected with eccentric L on the shaft M, so such valves $i$ $i'$ may be alternately opened and closed.

The exhaust-port $w$ of the central or intermediate section or chamber is shown in Figs. 2 and 5.

In the present application I have illustrated the same construction of piston sections or blades and the channels leading thereto as are shown in my former application, Serial No. 266,716, filed March 8, 1888, such construction being for the purpose of enabling the operation of the piston blades or sections in and out by the action of the steam. As the said construction and its operation are fully described in my former application above described, and as I do not herein claim anything shown in my said former application, it does not seem necessary to describe the said construction in detail herein.

In specifically describing the construction which permits the alternate passage of the steam from the end to the central cylinder, I may state that my object has been in practice to make the channels or pipes leading from the said end cylinders to the inlet $H^2$ of the central cylinder of equal or greater area than the steam-space in the end cylinders between the ends of the blade at the instant one of such ends passes the inlet-port H, so that the steam in the space between the ends of the blade will at the instant the advance or front end of the blade passes exit-port H' pass into the pipe or connection I or I', and at the instant such steam passes into such pipe or connection the cut-off of such pipe will open and the steam will expand and pass into the central cylinder. It should be further remembered that the operation of the engine is very rapid, and that the opening and closing of the cut-offs are almost instantaneous.

Having thus described my invention, what I claim as new is—

1. A compound rotary engine consisting of a central chamber or section having a piston drum or head, the side sections arranged one on each side of the central section and having piston drums or heads, the shaft to which all three of said drums are secured and pipes or channels connecting the exhaust-ports of the side sections with the inlet-ports of the central section, substantially as set forth.

2. In a compound rotary engine, the combination, with a central chamber or section, of two side sections having their exhaust-ports connected with the inlet-port of the central section, such side sections being arranged to discharge their exhaust alternately into the said central section, substantially as set forth.

3. In a rotary engine, the combination of the central section, the side sections, the pipes or channels I I', connecting the exhaust-ports of the side sections with the inlet-port of the central section, the valves $i\ i'$, and connections between valves $i\ i'$ and an eccentric on the shaft, all substantially as and for the purposes specified.

LEWIS C. HUSON.

Witnesses:
E. P. MUCKLOW,
A. R. EDGETT.